(12) United States Patent
Rácz et al.

(10) Patent No.: US 12,050,452 B2
(45) Date of Patent: Jul. 30, 2024

(54) TECHNIQUE PROVIDING STATUS RELATING TO A WIRELESS DATA TRANSMISSION FOR INDUSTRIAL PROCESS CONTROL

(71) Applicant: Telefonaktiebolaget LM Ericsson (publ), Stockholm (SE)

(72) Inventors: Sándor Rácz, Cegléd (HU); János Harmatos, Budapest (HU); Norbert Reider, Tényö (HU); Geza Szabo, Kecskemet (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 635 days.

(21) Appl. No.: 17/284,866

(22) PCT Filed: Oct. 16, 2018

(86) PCT No.: PCT/EP2018/078195
§ 371 (c)(1),
(2) Date: Apr. 13, 2021

(87) PCT Pub. No.: WO2020/078536
PCT Pub. Date: Apr. 23, 2020

(65) Prior Publication Data
US 2021/0382462 A1    Dec. 9, 2021

(51) Int. Cl.
*G05B 19/418*    (2006.01)
*H04L 43/08*    (2022.01)
*H04L 67/125*    (2022.01)

(52) U.S. Cl.
CPC ........ *G05B 19/41855* (2013.01); *H04L 43/08* (2013.01); *H04L 67/125* (2013.01); *G05B 2219/31105* (2013.01)

(58) Field of Classification Search
CPC .... G05B 19/41855; G05B 2219/31105; H04L 43/08; H04L 67/125
See application file for complete search history.

(56) References Cited

U.S. PATENT DOCUMENTS 8,051,353 B2    11/2011    Maas et al.
9,936,028 B2 *    4/2018    Ganu .................... H04L 67/142
(Continued)

FOREIGN PATENT DOCUMENTS

WO    2010092172 A1    8/2010

OTHER PUBLICATIONS

Industrial communication networks—Profiles—Part 3-3: Functional safety fieldbuses—Additional specifications for CPF 3IEC 61784-3-3 Ed. Jun. 2010, International Standard, IEC, p. 5, and p. 7 (Year: 2010).*

(Continued)

*Primary Examiner* — Nabil H Syed
*Assistant Examiner* — Cal J Eustaquio
(74) *Attorney, Agent, or Firm* — Weisberg I.P. Law, P.A.

(57) ABSTRACT

A technique for providing status information relating to a wireless data transmission that is used to control an industrial process by a remote controller is presented, wherein the remote controller is coupled to a field device of the industrial process via a wireless communication network supporting the wireless data transmission. An apparatus implementation of the technique comprises a first interface configured to be coupled to one of a user equipment, a radio access network and a core network of the wireless communication network, and a second interface compliant with an industrial process communication protocol used for communication between the remote controller and the at least one first field device. The apparatus is configured to receive the status information via the first interface and provide the status information, or (Continued)

information derived therefrom, via the second interface towards the remote controller.

15 Claims, 6 Drawing Sheets

(56) References Cited

U.S. PATENT DOCUMENTS

| | | | |
|---|---|---|---|
| 10,637,719 B2* | 4/2020 | Xiong | H04L 12/12 |
| 2012/0038465 A1* | 2/2012 | Goossens | G06K 17/0022 |
| | | | 340/10.4 |
| 2012/0236768 A1 | 9/2012 | Kolavennu et al. | |
| 2013/0212214 A1* | 8/2013 | Lawson | H04L 67/12 |
| | | | 709/217 |
| 2015/0081922 A1 | 3/2015 | Brett | |
| 2015/0156285 A1 | 6/2015 | Blair | |
| 2017/0163444 A1 | 6/2017 | McLaughlin et al. | |
| 2017/0171048 A1* | 6/2017 | Christmann | H04L 43/08 |
| 2019/0239285 A1* | 8/2019 | Samudrala | H04L 69/08 |

OTHER PUBLICATIONS

Tucker, Chole; Dec. 21, 2010; #Computer Networking; Teh OSI Model-The Seven Layers of Networking Explained in Plain English; p. 8/27, the cited controller 510 and industrial device 512's wireless communications are Nodes (devices) and networking hardware components (Year: 2010).*

International Search Report and Written Opinion dated Jun. 21, 2019 for International Application No. PCT/EP2018/078195 filed on Oct. 16, 2018, consisting of 12-pages.

* cited by examiner

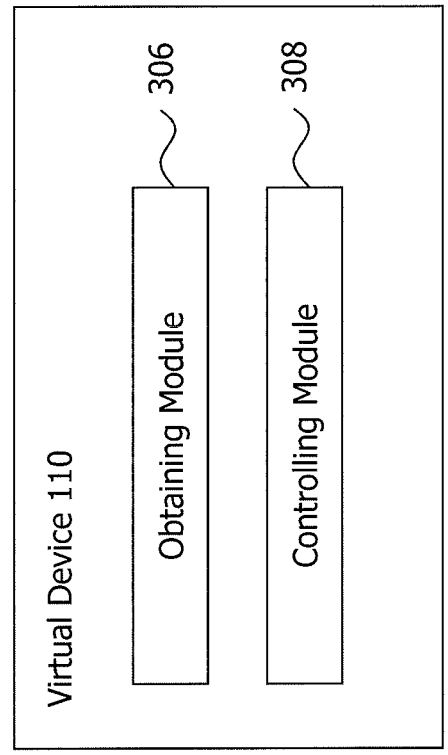
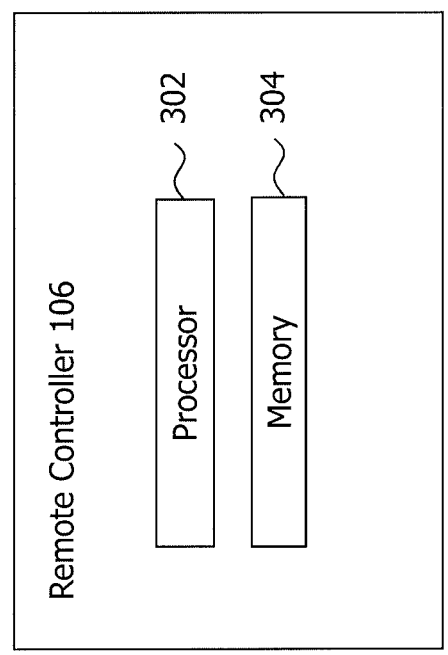
Fig. 3B
Fig. 3A

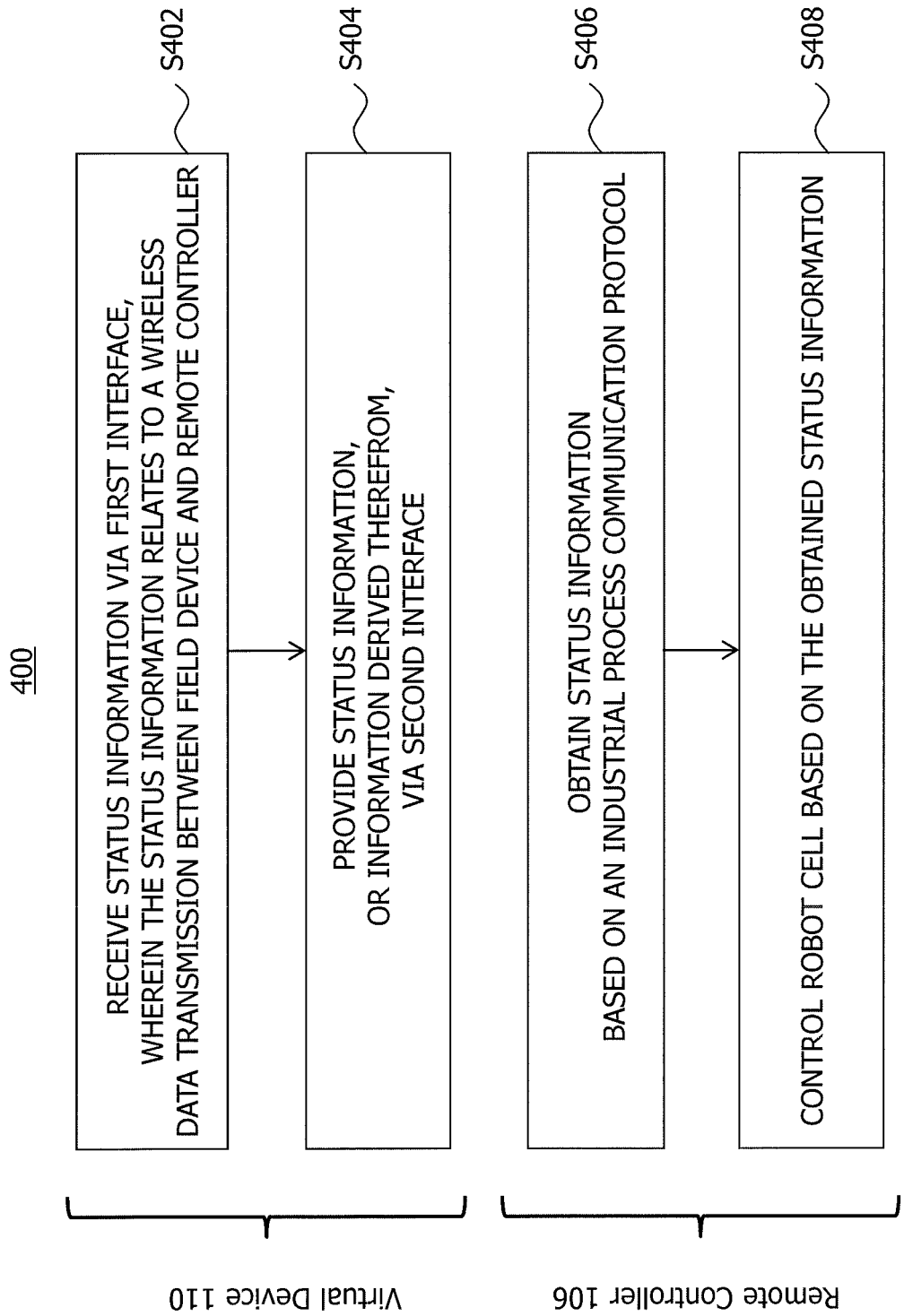

TECHNIQUE PROVIDING STATUS RELATING TO A WIRELESS DATA TRANSMISSION FOR INDUSTRIAL PROCESS CONTROL

CROSS-REFERENCE TO RELATED APPLICATIONS

This application is a Submission Under 35 U.S.C. § 371 for U.S. National Stage Patent Application of International Application Number: PCT/EP2018/078195, filed Oct. 16, 2018 entitled "TECHNIQUE FOR PROVIDING STATUS INFORMATION RELATING TO A WIRELESS DATA TRANSMISSION FOR INDUSTRIAL PROCESS CONTROL," the entirety of which is incorporated herein by reference.

TECHNICAL FIELD

The present disclosure generally relates to industrial automation. In particular, a technique is presented for providing status information relating to a wireless data transmission that is used to control an industrial process. The technique may be implemented in the form of an apparatus, a wireless communication network portion, a controller, a method, and a computer program product.

BACKGROUND

In industrial automation, field devices within an industrial process domain are often controlled from a distant site by a remote controller. The remote controller can, for example, be deployed in a computing cloud. Control data generated by the remote controller in the computing cloud can be wirelessly transmitted to the industrial process domain.

Existing communication protocols for industrial automation (e.g., EtherCAT or ProfiNet) have been developed for situations in which the controller is situated in the industrial process domain and connected to the field devices via hardwired field buses. These protocols assume that data transmission from the controller to the field devices is reliable and has no substantial delay. This is a fair assumption given the fact that field buses are not impacted by the challenges of wireless data transmission, such as packet loss, jitter, wireless spectrum availability, re-transmission delay, and proper resource allocation. Wireless data transmission, on the other hand, introduces latency and, thus, negatively impacts the deterministic behaviour of industrial process control compared to hardwired solutions.

Cellular wireless communication networks of the $5^{th}$ Generation (5G) are configured to provide Ultra-Reliable Low Latency Communication (URLLC) of down to 0.5 ms latency for a vast set of applications including industrial process control. The support of URLLC services comes at the cost of reduced spectral efficiency compared to mobile broadband services without latency and reliability constraints.

In URLLC, spectral efficiency significantly depends on the Quality of Service (QoS) that is to be provided. For example, URLLC with 1 ms latency can have about three times lower spectral efficiency compared to URLLC with 10 ms latency. In wireless communication networks in which the share of the URLLC traffic becomes significant in the overall load, optimized use of URLLC can thus improve network capacity.

Industrial process control can be performed at various levels in regard to latency and other QoS requirements. For example, a highly delay sensitive task is a closed-loop control (e.g., a Proportional-Integral-Derivative, PID, control of servos in the robot cell), with required update times of typically between 1 and 15 ms. Higher level control (e.g., when movement commands are sent to valves or conveyor belts) also benefit from low update times, but low update times are not always necessary for such control tasks.

In industrial process control it is crucial that the controller has sufficient and, in the ideal case, real-time knowledge about any transmission problems (e.g., due to delayed or lost data frames). Based on such knowledge, the controller can take proper action to possibly compensate the transmission problems, rather than stop the whole industrial process. In case of a wire-based data transmission, the loss of only a few consecutive frames implies a serious transmission problem and leads to drastic actions. Such drastic actions may not be required in wireless transmission scenarios, depending on the particular transmission problem

SUMMARY

There is a need for a technique of improving wireless industrial process control.

According to one aspect an apparatus configured to provide status information relating to a wireless data transmission that is used to control an industrial process by a remote controller is presented, wherein the remote controller is coupled to at least one first field device of the industrial process via a wireless communication network supporting the wireless data transmission. The apparatus comprises a first interface configured to be coupled to one of a user equipment, a radio access network and a core network of the wireless communication network, and a second interface compliant with an industrial process communication protocol used for communication between the remote controller and the at least one first field device. The apparatus is configured to receive the status information via the first interface and provide the status information, or status information derived therefrom, via the second interface towards the remote controller.

As used herein, the term "user equipment" (or UE) is meant to be understood in a broad manner to generally denote a communication device capable of wirelessly being served by a radio access network. For this reason the industrial process may be considered to constitute the "user" of the corresponding communication device. The term "user equipment" includes the corresponding communication devices denoted by this term in certain wireless communications standards, but is not restricted to such communication devices.

The apparatus may be configured to process the received status information so as to derive processed status information. The processing performed by the apparatus may, for example, be an aggregation or a statistical processing (e.g., an averaging).

The first interface may be a proprietary interface or an interface compliant with a wireless communication protocol supported by the wireless communication network. The first interface may be configured to be coupled to a complementary interface within the user equipment, the radio access network and the core network. The first interface may be a software-based interface.

In one variant, the apparatus is configured to present itself via the second interface as a ("virtual") second field device to the remote controller. The remote controller may thus treat the apparatus like a "regular" first field device, such as a sensor in an industrial process domain. In order to obtain the status information, the remote controller may for example use the same mechanisms as it regularly uses to obtain sensory information from the industrial process domain. As an example, if the first field device is configured to write in a reserved first memory region accessible by the remote controller and reserved for the first field device, the second field device may be configured to write in a reserved second memory region accessible by the remote controller in the same manner as the first memory region.

The second interface may be located on Layer 1 of the Open Systems Interconnection, OSI, model. Layer 1 is also called physical layer. The second interface may be hardware interface. The second interface may be a wire-based interface. For example, the second interface may be configured to be coupled to a field bus.

The industrial process communication protocol and/or the second interface may be compliant with at least one of International Electrotechnical Commission, IEC, standard 61158 and IEC standard 61784. As an example, the industrial process communication protocol and/or the second interface may be compliant with ProfiNet or EtherCAT.

The industrial process may be controlled via one, two or more radio bearers. The one, two or more radio bearers may each stretch between the radio access network and the user equipment. Different bearers may provide different QoS levels, such as in terms of latency. The different QoS levels and, thus, the different radio bearers may be associated with different first field devices of the industrial process. In some variants, the received status information is associated with exactly one radio bearer.

The industrial process may be controlled using a flow of data frames between the remote controller and the industrial process (e.g., the one or more first field advices). A format of the data frames may be defined in the industrial process communication protocol.

The status information may pertain to a transmission state of one or more data frames. The one or more data frames may be associated with a dedicated data flow as identified by a flow identifier.

In some implementations, the status information is provided on a per-data frame basis and/or on a per-data flow basis. The status information may permit to investigate the transmission state of a particular data frame by the remote controller (e.g., when the remote controller is still awaiting this data frame from the industrial process domain or is interested if this data frame has actually been delivered to the industrial process domain). The data frame may be transmitted in a downlink direction or in an uplink direction. As such, also the transmission state may relate to one of the downlink direction and the uplink direction.

The status information may pertain to one or more of the following, or other, data frame transmission states:
 data frame arrived at the radio access network for wireless transmission towards the industrial process;
 data frame successfully delivered by the radio access network towards the industrial process;
 the radio access network started to wirelessly transmit a data frame;
 the radio access network triggered retransmission of a data frame;
 the radio access network dropped a data frame;
 the data frame successfully delivered to the remote controller; and
 ongoing data frame transmission from the industrial process.

The status information may associate an individual data frame transmission state with supplemental information.

The supplemental information may include at least one of a data flow identifier, a flow update time and a time stamp. In some cases, the supplemental information has been obtained by packet inspection in at least one of the user equipment, the radio access network and the core network. To this end, shallow packet inspection may be applied.

The apparatus may be configured to operate in real-time. As such, the status information provided by the apparatus may be used by the remote controller for real-time control of the at least one first field device.

Also provided is a wireless communication network portion comprising the apparatus presented herein. In some variants, the apparatus is co-located with one of the user equipment and the radio access network. In some variants, the apparatus may be a virtual device configured from computing resources of the user equipment or the radio access network. As an example, the apparatus may be configured as a virtual device on a radio access network node.

According to a further aspect, a remote controller for controlling at least one first field device of an industrial process using a wireless data transmission is presented. The remote controller is configured to obtain, based on an industrial process communication protocol that is used for communication between the remote controller and the at least one first field device, status information relating to the wireless data transmission. The remote controller is further configured to control the industrial process based on the obtained status information.

The status information obtained by the remote controller may relate to a wireless data transmission towards (downlink) or from (uplink) the first device. In such case the remote controller may be configured to control the first device based on the obtained status information.

The status information may be "raw" status information as generated within the wireless communication network. Alternatively, the "raw" status information has been preprocessed so that the status information obtained by the remote controller is preprocessed status information.

As explained above, the status information may be obtained from an apparatus in the wireless communication network that presents itself as a second field device to the remote controller. As such, the remote controller may use the same mechanism to obtain information from any first field device (that is involved in the industrial process as such) and the second field device (i.e., from the apparatus providing the status information about the wireless data transmission).

The industrial process may be controlled using a flow of data frames between the remote controller and the industrial process (e.g., the one or more first field devices). In such a case, the remote controller may be configured to obtain (e.g., to request or read) the status information in response to a determination that a data frame has not arrived in time from the industrial process.

The remote controller may be configured to obtain the status information in regard to two or more first field devices executing a collaborative task in the industrial domain. As such, the remote controller may evaluate the status information in regard to proper execution of the collaborative task.

The remote controller may be configured from cloud-computing resources. The remote controller may be configured as a virtual Programmable Logic Controller (PLC).

Also provided is a method of providing status information relating to a wireless data transmission that is used to control an industrial process by a remote controller coupled to at least one field device of the industrial process via a wireless communication network supporting the wireless data transmission, wherein the method comprises receiving the status information via a first interface configured to be coupled to one of a user equipment, a radio access network and a core network of the wireless communication network, and providing, via a second interface compliant with an industrial process communication protocol used for communication between the remote controller and the at least one field device, the status information, or status information derived therefrom, towards the remote controller.

Still further, a method of controlling at least one field device of an industrial process using a wireless data transmission between a remote controller and the at least one first field device is provided, the method comprising obtaining, based on an industrial process communication protocol that is used for communication between the remote controller and the at least one field device, status information relating to the wireless data transmission, and controlling the industrial process based on the obtained status information.

The methods presented herein may be performed by an apparatus or a remote controller, respectively, as generally described above and as described below in more detail.

Also provided is a computer program product comprising program code for performing the steps of any of the method aspects presented herein when executed by one or more processors. The computer program product may be stored on a computer-readable recording medium. The computer program product may also be provided for download via a network connection.

Moreover, a cloud computing system is presented that is configured to perform any of the remote controller-related method aspects presented herein. The cloud computing system may comprise distributed cloud computing resources that jointly perform the remote controller-related method aspects presented herein under control of one or more computer program products.

BRIEF DESCRIPTION OF THE DRAWINGS

Further aspects, details and advantages of the present disclosure will become apparent from the detailed description of exemplary embodiments below and from the drawings, wherein:

FIGS. 3A & B illustrate remote controller embodiments of the present disclosure; and FIG. 4 illustrates method embodiments of the present disclosure.

DETAILED DESCRIPTION

Figure 1A:
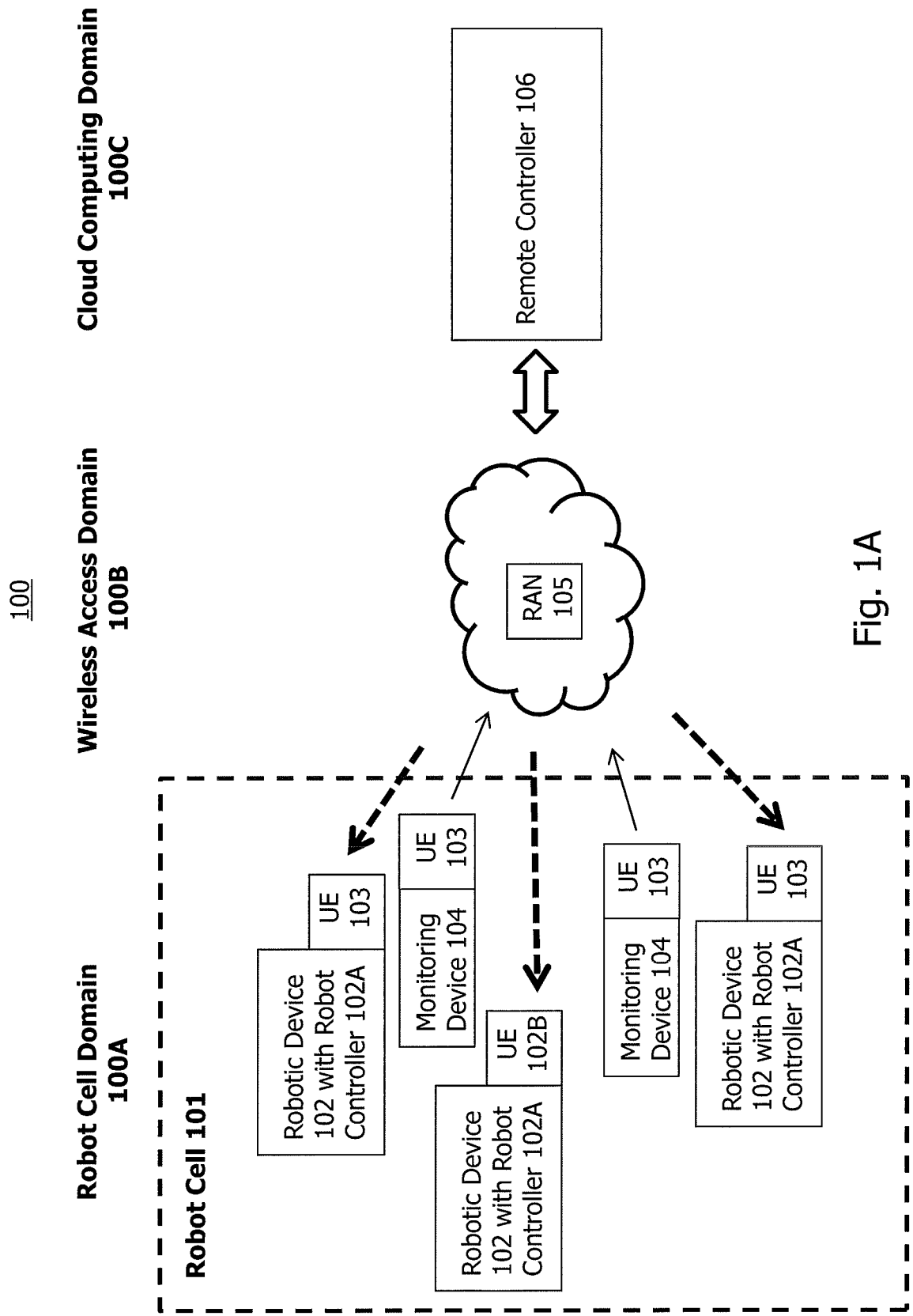
FIGS. 1A & B illustrate two network system embodiments of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on specific radio access network types such as 5G radio access networks, the present disclosure can also be implemented in connection with other radio access network types (e.g., 4G radio access networks). Moreover, while certain aspects in the following description will exemplarily be described in connection with cellular networks, particularly as standardized by the $3^{rd}$ Generation Partnership Project (3GPP), the present disclosure is not restricted to any specific wireless access type. While some of the embodiments are explained using ProfiNet as an exemplary industrial process communication protocol, the present disclosure can also be implemented using any other industrial process communication protocol such as EtherCAT (e.g., protocols compliant with IEC 61158 and/or IEC 61784).

Those skilled in the art will further appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1A illustrates a first embodiment of a network system 100 in which the present disclosure can be implemented. As shown in FIG. 1A, the network system 100 comprises a robot cell domain 100A, a wireless access domain 100B, and a cloud computing domain 100C. The wireless access domain 100B belongs to a wireless communication network that also comprises a core network and one or more wireless endpoints.

The robot cell domain 100A comprises a robot cell 101 as one example of an industrial process. The present disclosure could, of course, also be implemented in the context of chemical process control or control of any other industrial process.

The robot cell 101 comprises multiple robotic devices 102 each having a dedicated local robot controller 102A. Each robotic device 102, such as a robot arm movable within various degrees of freedom, may comprise multiple actuators (e.g., servos). Multiple robotic devices 102 within the robot cell 101 may collaboratively work on the same task (e.g., on the same work product).

Each local controller 102A comprises or represents, from the perspective of an industrial process communication protocol such as ProfiNet, a field device (e.g., an Input/Output, I/O, device) within the robot cell domain 100A. The local controllers 102A may have components, such as software and/or hardware interfaces, functionally located on OSI level 1 (physical level). The local controllers 102A may comprise hardware PLCs, discrete PID controllers, or similar devices.

In the embodiment of FIG. 1A, each robotic device 102 is associated with a wireless endpoint 103 for wireless communication with the wireless access domain 100B. Such a wireless endpoint 103 is sometimes also referred to as User Equipment (UE) herein and in some wireless communication standards.

The robot cell domain 100A further comprises multiple monitoring devices 104 such as cameras, motion sensors, and so on. The monitoring devices 104 generate robot cell state data (i.e., sensory information) indicative of a state of the robot cell 101. One or more of the monitoring devices 104 can also be integrated into one or more of the robotic devices 102. Moreover, in some variants also one or more of the local controllers 102A may function as monitoring devices 104 capable of generating robot cell state data indicative of a state of the associated robotic device 102.

Each monitoring device 104 comprises or represents, from the perspective of an industrial process communication protocol such as ProfiNet, a field device (e.g., an Input/Output, I/O, device) within the robot cell domain 100A. In the embodiment of FIG. 1A, each monitoring device 104 is associated with a wireless endpoint ("UE") 103 for wireless communication with the wireless access domain 100B.

The wireless access domain 100B belongs to a cellular and/or non-cellular wireless communication network, for example as specified by 3GPP (e.g., a 5G network). In some implementations, the wireless access domain 100B of the wireless communication network is compliant with the 3GPP standards according to Release R15, such as TS 23.503 V15.1.0 (2018-3) or later. The wireless access domain 100B comprises a Radio Access Network (RAN) 105 with one or more base stations and/or one or more wireless access points that enable a wireless communication between the UEs 103 in the robot cell 101 on the one hand and the cloud computing domain 100C on the other.

As illustrated in FIG. 1A, the robotic devices 102 with their associated local robot controllers 102A are configured to receive control data generated in the cloud computing domain 100C from the wireless access domain 1006. Moreover, the state data as acquired by the monitoring devices 104 and the local controllers 102A are wirelessly communicated via the wireless access domain 100B to the cloud computing domain 100C. Processing of the state data in the cloud computing domain 100C may be performed in the context of inverse kinematics, in a PID control context, in a robot cell security context or in the context of performance monitoring and control.

The cloud computing domain 100C comprises a central controller ("remote controller") 106 composed of cloud computing resources. The remote controller 106 is configured to receive the robot cell state data from the monitoring devices 104 and the local controllers 102A via the wireless access domain 100B. The remote controller 106 is further configured to receive status information relating to the wireless transmission of data frames between the remote controller and the robot cell field devices (i.e., the monitoring devices 104 and the local controllers 102A).

The remote controller 106 is configured to generate control data for the robotic devices 102, optionally on the basis of the robot cell state data and/or the status information pertaining to the wireless data transmission, and to forward the control data via the wireless access domain 100B to the local controllers 102A of the robotic devices 102. The local controllers 102A are configured to receive the control data and to control one or more individual actuators of the respective robotic device 102 based thereon.

Figure 1B:
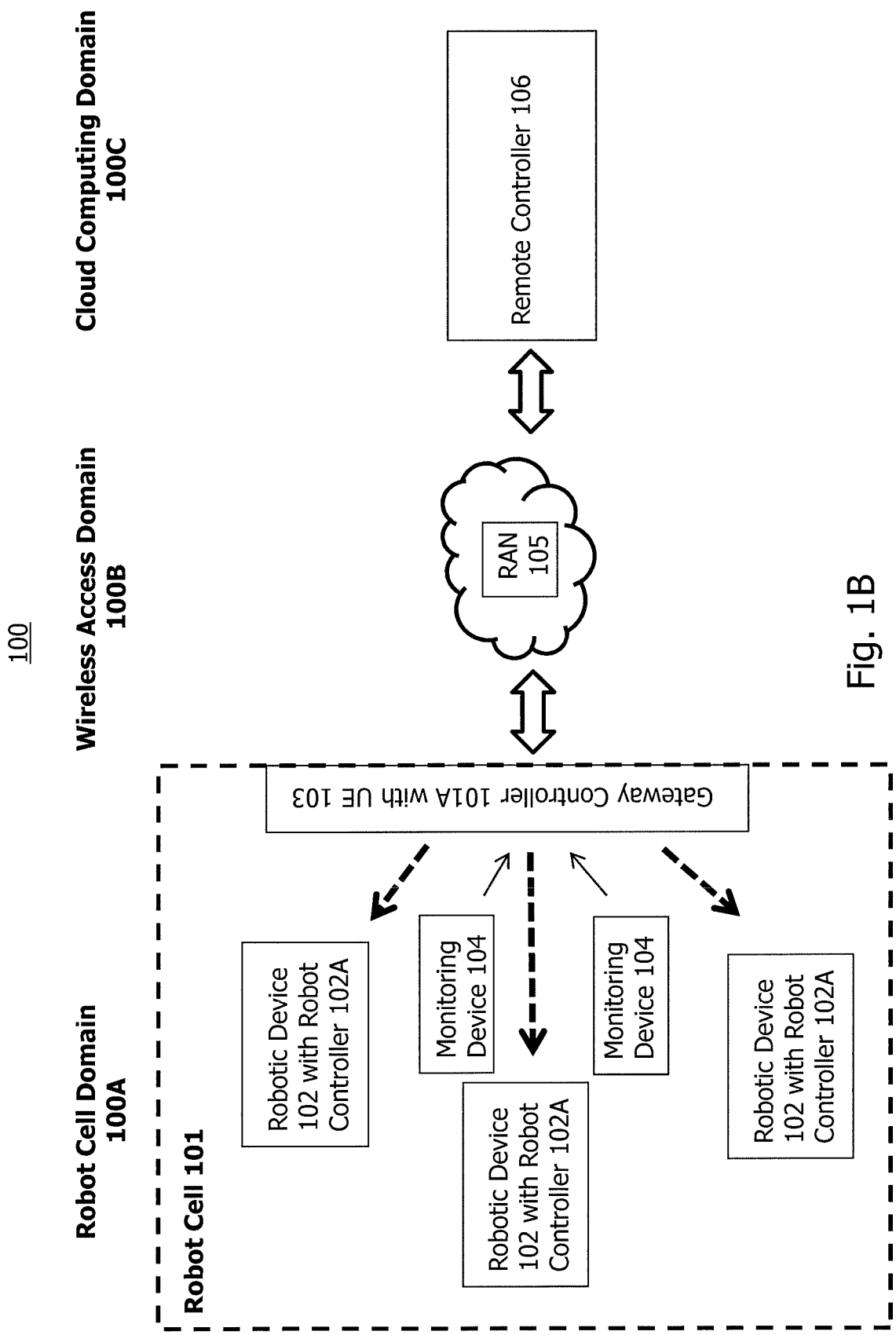
FIG. 1C illustrates possible locations of virtual device embodiments according to the present disclosure.

FIG. 1B shows a second embodiment of the network system 100. The second nets work system embodiment is similar to the first network system embodiment described with reference to FIG. 1A with the exception of the provision of a central gateway controller 101A within the robot cell 101. Instead of associating an individual UE 103 with each field device in the robot cell 101 (i.e., with each robotic device 102 and each monitoring device 104), a single UE 103 is associated with the gateway controller 101A for wireless data transmission between the remote controller 106 and the robot cell 101. The gateway controller 101A, in turn, is coupled via a wire-based field bus to each of the robotic devices 102 and the monitoring devices 104 in the robot cell 101. In the first network system embodiment of FIG. 1A, there may be a similar field bus-type connection between each UE 103 and the associated robotic device 102 or monitoring device 104.

Figure 1C:
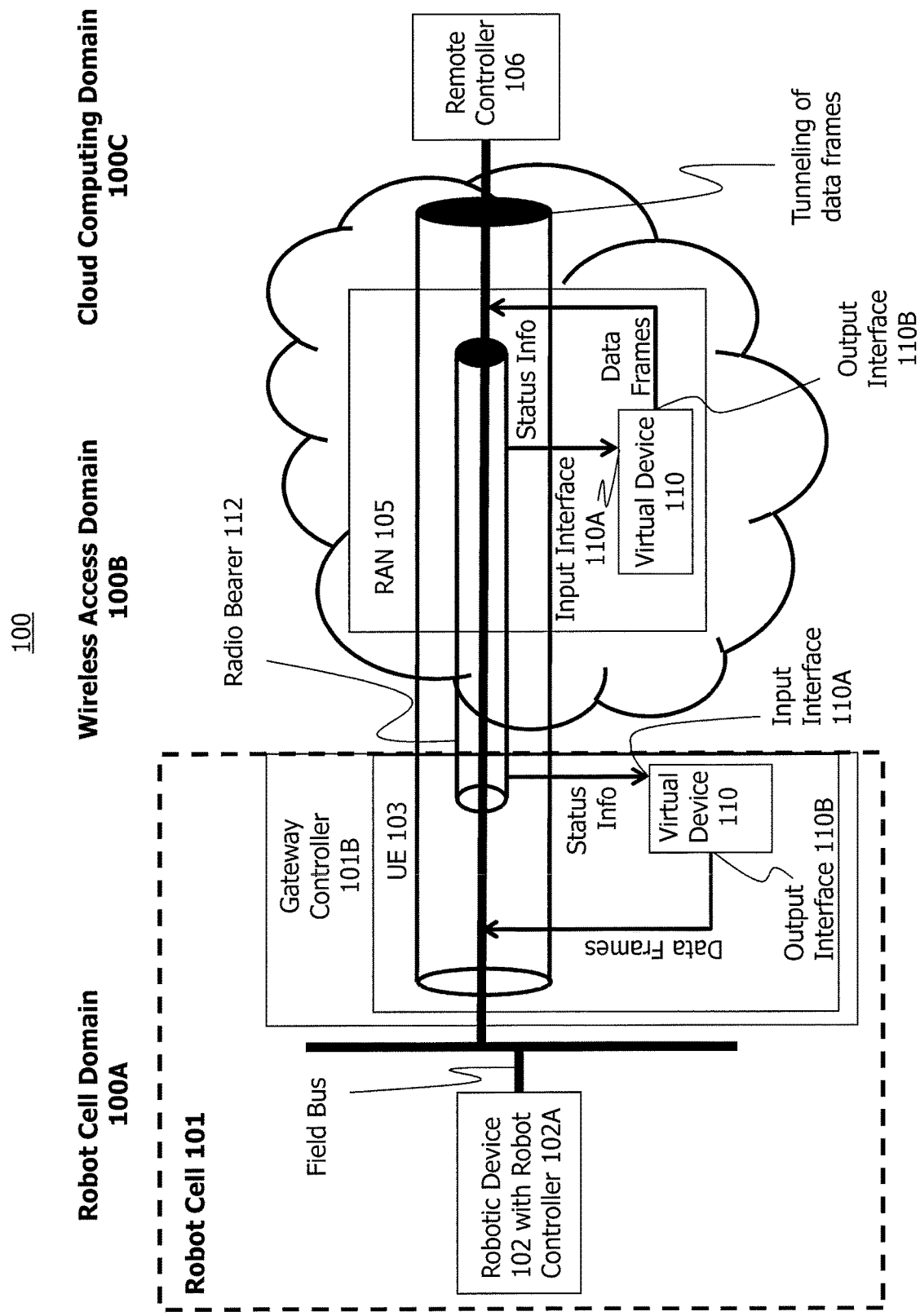

FIG. 1C illustrates a portion of the second network system embodiment of FIG. 1A with a single field device (robotic device 102) in the robot cell 101. FIG. 1C specifically illustrates the exemplary placement of two apparatuses 110 in the UE 103 and the RAN 105, respectively. These apparatuses 110 are configured to present themselves as "virtual" field devices to the remote controller 106. This means that using an industrial process communication protocol such as ProfiNet, the remote controller 106 will communicate with the apparatuses 110 in the same manner as with any of the "regular" field devices 102A, 104 in the robot cell 101. For this reason the apparatuses 110 will also be referred to as "virtual devices" hereinafter.

The virtual devices 110 are placed in the wireless communication network and configured to provide status information that relates to a wireless data transmission between the remote controller 106 and each "regular" field device 102A, 104 in the robot cell 101. The status information specifically pertains to a radio bearer 112 stretching between the RAN 105 and the UE 103 and providing the wireless data transmission services. It will be appreciated that in other embodiments multiple radio bearers 112 may be provided between the RAN 105 and the UE 103 (e.g., to provide different QoS levels for different field devices 102A, 104), wherein status information is individually provided per radio bearer 102.

While two virtual devices 110 are illustrated in FIG. 1C, in certain implementations more or less two virtual devices 110 may be provided in the network system 100. As an example, the virtual device 110 in one of the UE 103 and the RAN 105 of FIG. 1C may be omitted. As a further example, each individual UE 103 in the first network system embodiment of FIG. 1A may be provided with a dedicated virtual device 110 (optionally in addition to or instead of a virtual device 110 in the RAN 105 of FIG. 1A). Moreover, in some variants a virtual device 110 may also be placed in a core network portion of the wireless communication network.

With reference to FIG. 1C, data frames of the industrial process communication protocol are transferred on a field bus that virtually stretches between the remote controller 106 and each field device 102A, 104 in the robot cell 101. Since that field bus does not physically stretch through the wireless access domain 100B, the associated data frames are tunneled through the wireless access domain 100B as shown in FIG. 1C. The two opposite tunneling ends interface a wire-based field bus.

As shown in FIG. 1C, each virtual device 110 comprises an input interface 110A and an output interface 1106. Each of the interfaces 110A and 110B may be a hardware interface, or a software interface, or a combination thereof.

The input interfaces 110A are configured to receive status information relating to the wireless data transmission. In more detail, the status information may specifically pertain to aspects of the radio bearer 112 that is used to wirelessly transmit the data frames from the RAN 105 to the UE 103 and vice versa. The input interfaces 110A may internally be coupled within the UE 103 and the RAN 105, respectively, to a corresponding internal interface of the UE 103 and the RAN 105, respectively. The first interfaces 110A may be proprietary interfaces or interfaces compliant with a wireless communication protocol underlying the wireless access domain 100B.

In some wireless communications protocols, the standardized interfaces (such as an operations and maintenance, O&M, interface as specified by 3GPP) for fetching status information from an associated radio access network are slow and only capable of providing status information in an overly aggregated manner. In such (and other) cases, the first interfaces 110A may be realized as proprietary interfaces.

The output interfaces 110B, are compliant with the industrial process communication protocol used for communication between the remote controller 106 and the field devices 102A, 104 in the robot cell 101. As an example, these interfaces 110B may be compliant with ProfiNet. The output interfaces 110B are configured to output the status information, optionally after one or more processing steps within the virtual devices 110, in data frames that are compliant with the industrial process communication protocol. These data frames may then be inserted (or "injected") within the UE 103 and the RAN 105 between the "regular" data frames communicated from the "regular" field devices 102A, 104 on the field bus towards the remote controller 106.

The output interfaces 110B may take the form of dedicated ports (e.g., an input memory map address of the remote controller 106) to "publish" the status information for being read by the remote controller 106. In this way, the remote controller 106 may use the same process to read the virtual devices 110 and the "regular" field devices 102A, 104. The associated data frames including this status information can transparently be transported on the field bus infrastructure to which the remote controller 106 is attached.

Figure 2B:
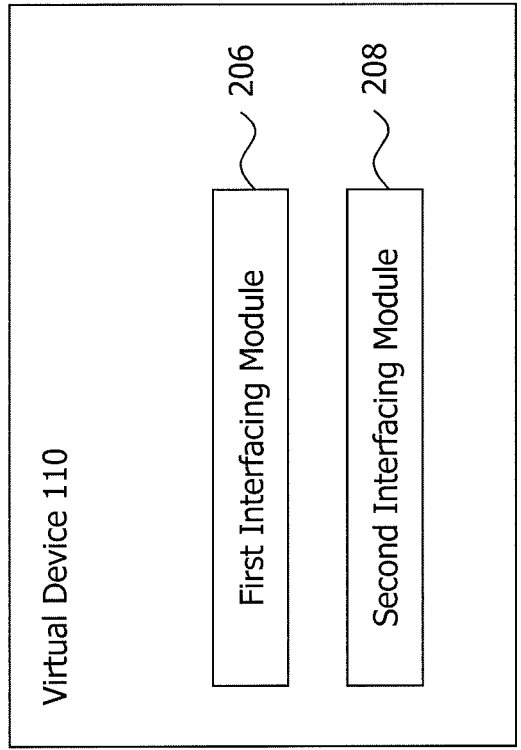
FIGS. 2A & B illustrate virtual device embodiments of the present disclosure.
Figure 2A:
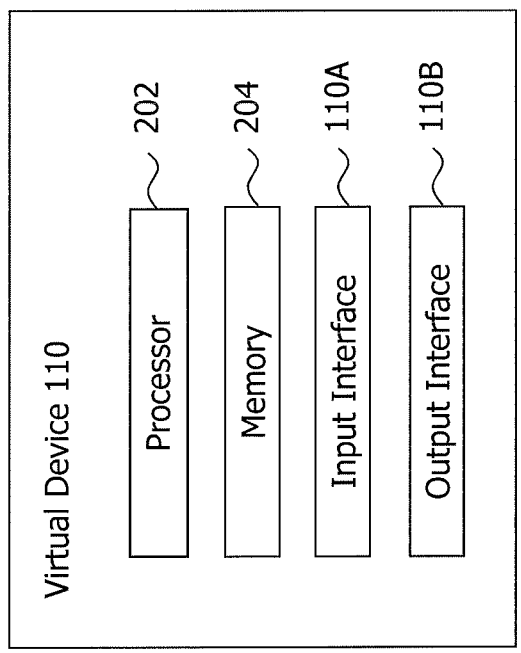

FIGS. 2A and 2B illustrate two embodiments of the virtual devices 110 of FIG. 1C. In the embodiment illustrated in FIG. 2A, the virtual device 110 comprises a processor 202 and a memory 204 coupled to the processor 202. The virtual device 110 further comprises the input interface 110A and the output interface 110B as discussed above with reference to FIG. 1C. The memory 204 stores program code that controls operation of the processor 202.

The processor 202 is configured to receive the status information relating to wireless data transmission via the input interface 110A from the UE 102 or the RAN 105. The processor 202 is further configured to provide the status information via the output interface 110B towards the remote controller 106. In this regard, the processor 202 may in some variants perform a protocol conversion between a wireless communication protocol format in which the status information is received via the input interface 110A and an industrial process communication protocol format in which the status information is provided via the output interface 110B towards the remote controller 106. The status information as such may transparently be transferred from the input interface 110A to the output interface 110B. Alternatively, the processor 202 may process the status information before outputting it via the output interface 110B.

FIG. 2B shows an embodiment in which the virtual device 110 is implemented in a modular configuration. As shown in FIG. 2B, the virtual device 110 comprises a first interfacing module 206 and a second interfacing module 208. The first interfacing module 206 is configured to be coupled to one of the UE 103 and the RAN 105 (or a core network) of the wireless communication network. The second interfacing module 208 is compliant with an industrial process communication protocol used for communication between the remote controller 106 and the field devices 102A, 104 in the robot cell 101. The virtual device 110 of FIG. 2B is configured to receive the status information via the first interfacing module 2006 and to provide the received status information, or status information derived from, via the second interface 110B towards the remote controller 106.

FIGS. 3A and 3B illustrate two embodiments of the remote controller 106 of FIGS. 1A to 1C. In the embodiment illustrated in FIG. 3A, the remote controller 106 comprises a processor 302 and a memory 304 coupled to the processor. The memory 304 stores program code that controls operation of the processor 302.

The processor 302 is configured to obtain, based on an industrial communication protocol that is used for communication between the remote controller 106 and the field devices 102A, 104 in the robot cell 101, status information relating to the wireless data transmission illustrated in FIGS. 1A to 1C. The processor 302 is further configured to control the industrial process 101 (and in particular one or more of the field devices 102A) based on the obtained status information.

FIG. 3B shows an embodiment in which the remote controller 106 is implemented in a modular configuration. As shown in FIG. 3B, the remote controller 106 comprises an obtaining module 306 configured to obtain status information relating to the wireless data transmission illustrated in FIGS. 1A to 1C. This status information is obtained in accordance with (e.g., in a format compliant with) the industrial process communication protocol that is used for communication between the remote controller 106 and the one or more field devices 102A, 104 in the robot cell 101. The controlling module 308 is configured to control the industrial process (and in particular the field devices 102A) based on the obtained status information.

FIG. 4 illustrates in a flow diagram 400 a method embodiment of providing status information by the virtual device 110 and controlling the robot cell 101 based on the provided status information. The method embodiment may be performed by any of the embodiments of FIG. 2A or 2B and FIGS. 3A and 3B.

In step S402, the virtual device 110 receives via the first interface 110A status information pertaining to the wireless data transmission illustrated in FIGS. 1A to 1C. In a further step S404, the virtual device 110 provides the received status information, or status information derived therefrom, via the second interface 110B towards the remote controller 106.

The remote controller 106 obtains the status information provided by the virtual device 110 in step S406. As explained above, the status information is obtained based on the industrial process communication protocol used for communication between the remote controller 106 and the one or more field devices 102A. In one implementation, the virtual device 110 presents itself via the second interface 110B as a "virtual" field device to the remote controller 106. As such, the remote controller 106 may obtain the status information from the virtual device 110 in a similar manner as information is obtained from the "regular" field devices 102A, 104.

In a further step S408, the remote controller controls the robot cell 101 based on the obtained status information. This robot cell control may in particular relate to a control of the one or more field devices 102A in the robot cell 101 that are associated with the robotic devices 102.

In the following, some embodiments of robot cell control by the remote controller 106 based on status information received from one or more virtual devices 110 will be discussed.

In one embodiment, the remote controller 106 determines that a data frame expected from the robot cell 102 has not arrived in time (e.g., a data frame required for PID control of one of the field devices 102A). In such a case, the remote controller 106 will obtain (e.g., request or read) the status information associated with the missing data frame as provided by one of the virtual devices 110. Based on the status information thus obtained, the remote controller 106 can initiate one or more control actions pertaining to the robot cell 101. If, for example, a data frame with important data has not arrived from one of the field devices 102A, the remote controller 106 may only temporarily stop the robot cell 101 if the obtained status information reveals that there is an ongoing data transmission (identified, e.g., by a specific flow identifier) from the robot cell 101 that potentially includes the missing data frame.

In an another control embodiment, the remote controller 106 may obtain the status information in regard to two or more of the field devices 102A that execute a collaborative task that needs to be coordinated. As an example, two robot arms as exemplary robotic devices 102 may need to perform precise and synchronized movements, and need to avoid any collisions. The remote controller 106 may then evaluate the status information to determine if the collaborative task can properly be executed by the robot arms. As an example, based on the status information, the remote controller 106 may determine that the associated data frames for collaborative control have been sent or have arrived at each of the associated field devices 102A in time. In such a case the remote controller 106 can deduce that the collaborative task can properly be performed. If, on the other hand, the remote controller 106 determines from the status information that one or more data frames pertaining to control of an individual one of the two field devices 102A has nor arrived in time, it can deduce that the collaborative task cannot properly be executed and control the remaining field device 102A in an appropriate manner (e.g., stop or delay certain movement actions or modify the movement paths of the robot arms).

To obtain the status information for the above and other control embodiments, each radio bearer 112 that is serving the robot cell 101 is monitored and associated status information is evaluated either within the wireless communication network but outside the virtual device 110, or by the virtual device itself. Using shallow packet inspection of the data frames, flows can thus be identified (FlowID), and update times can be determined. For example, in case of ProfiNet the first two bytes of a ProfiNet IO data frame contain the flow ID which identifies the flow.

Each data frame also contains a cycle counter (2 byte). From the cycle counter, an update time of the flow can be determined (update time=31.25 usec×(difference of cycle counter of two consecutive data frames). Based on the latest data frame arrival time, the desired arrival time of the next data frame can be calculate as the latest frame arrival time plus the update time of the flow. As said, these calculations can be performed either by the virtual device 110 itself based on the received status information or outside the virtual device 110.

In the downlink direction, for each incoming data frame at the UE 103 and/or the RAN 105, different radio transmission events pertaining to data frame transmission states are collected. Each event is time-stamped and extended with the associated flow identifier. For example, the following data frame transmission states can be collected from a radio module of, for example, a base station of the RAN 105 in a downlink direction:

FrameArrived: Frame arrived at radio module for transmission to UE 103.

FrameDelivered: Frame successfully delivered to UE 103.

FrameTransmissionStarted: Radio module started to transmit the data frame over radio interface.

H-ARQ-RetransmissionTriggered: H-ARQ retransmission is triggered by radio module.

FrameDropped: Data frame is dropped by radio module, e.g., residual HARQ retransmission error or scheduler dropped the data frame.

The status information can be provided per event (i.e., per dedicated data frame transmission state). The status information may be provided per event as a data tuple comprising at least a time stamp "TS", a flow identifier "FlowID" and a data frame transmission state indicative of the underlying data frame transmission state "Event". As such, a temporal sequence of such data tuples representative of individual items of status information as received or derived by the virtual device 110 in the RAN 105 (for provision to the remote controller 106) may look as follows {TS=1.000 sec, FlowID: 8008, Event=FrameArrived}
{TS=1.001 sec, FlowID: 8008, Event=FrameTransmissionStarted}
{TS=1.002 sec, FlowID: 8008, Event=FrameDelivered}
{TS=1.008 sec, FlowID: 8008, Event=FrameArrived}
{TS=1.009 sec, FlowID: 8008, Event=FrameTransmissionStarted}
{TS=1.012 sec, FlowID: 8008, Event=H-ARQ-RetransmissionTriggered}
{TS=1.013 sec, FlowID: 8008, Event=FrameDelivered}

In the uplink direction, the UE 103 sends data frames to RAN 105. In this case, for example the following two events may be collected:

FrameDelivered: Data frame successfully delivered towards remote controller 106. This event contains a time stamp and a FlowID.

OngoingTransmission: UE 103 started to transmit data over its radio interface. This event contains time stamps. FlowIDs of one or more flows which have the closest desired arrival time (ClosestFlowIDs) are also added to the event. Thus, the remote controller 106 can be aware of that the UE side is trying to send a data frame that most probably belongs to the flow of ClosestFlowID.

As such, a temporal sequence of data tuples representative of individual items of status information as received or derived by the virtual device 110 in the UE 103 or the RAN 105 (for provision to the remote controller 106) may look as follows:

{TS=1.002 sec, FlowID: 8098, Event=FrameDelivered}
{TS=1.010 sec, FlowID: 8098, Event=FrameDelivered}
{TS=1.020 sec, Event=OngoingTransmission, ClosestFlowIDs: {8098}}
{TS=1.020 sec, FlowID: 8098, Event=FrameDelivered}

The above items of status information for the uplink direction and the downlink direction will be collected by the virtual devices 110 in one or both of the UE 103 and the RAN 105 for provision to the remote controller 106. In general the remote controller 106 can obtain the status information based on a pull mechanism or a push mechanism.

The remote controller 106 evaluates the status information thus obtained and takes proper control action as exemplarily explained above. The control logic of the remote controller 106 can thus be extended to properly handle wireless transmission events in an efficient manner.

Moreover, since the remote controller 106 can read the virtual devices 110 in the same way any "regular" field device 102A, 104 in the robot cell 101, there is no additional communication overhead on the side of the remote controller 106. That is, the virtual devices 110 can provide, or "publish", the status information on their output interfaces 1106 (e.g., ports) in the same manner as a monitoring device 104 (e.g., a sensor) would "publish" any robot cell state data towards the remote controller 106. This "publishing" can take place in real time, so that the remote controller 106 can process the status information for real time control of the robot cell 101.

While the present disclosure has been described with reference to exemplary embodiments, it will be appreciated that the present disclosure can be modified in various ways without departing from the scoop of the present disclosure as defined in the appended claims.

The invention claimed is:

1. An apparatus configured to provide status information relating to a wireless data transmission that is used to control an industrial process by a remote controller, the remote controller being coupled to at least one first field device of the industrial process via a wireless communication network supporting the wireless data transmission, the apparatus comprising:
    a first interface configured to be coupled to one of a user equipment, a radio access network and a core network of the wireless communication network;
    a second interface compliant with an industrial process communication protocol used for communication between the remote controller and the at least one first field device; and
    the apparatus being configured to receive the status information via the first interface and provide one of the received status information and status information derived therefrom, via the second interface towards the remote controller.

2. The apparatus of claim 1, wherein the apparatus is configured to present itself via the second interface as a second field device to the remote controller.

3. The apparatus of claim 1, wherein the second interface is located on Layer 1 of the Open Systems Interconnection, OSI, model.

4. The apparatus of claim 1, wherein the second interface is a wire-based interface.

5. The apparatus of claim 1, wherein at least one of the industrial process communication protocol and the second interface are compliant with at least one of International Electrotechnical Commission, IEC, standard 61158 and IEC standard 61784.

6. The apparatus of claim 1, wherein the industrial process is controlled via two or more radio bearers, and wherein the status information is associated with exactly one radio bearer.

7. The apparatus of claim 1, wherein the industrial process is controlled using a flow of data frames between the remote controller and the industrial process, and wherein the status information pertains to a transmission state of one or more data frames.

8. The apparatus of claim 7, wherein the status information pertains to one or more of the following data frame transmission states:
    data frame arrived at the radio access network for wireless transmission towards the industrial process;
    data frame successfully delivered by the radio access network towards the industrial process;
    the radio access network started to wirelessly transmit a data frame;
    the radio access network triggered retransmission of a data frame;
    the radio access network dropped a data frame;
    data frame successfully delivered to the remote controller; and
    ongoing data frame transmission from the industrial process.

9. The apparatus of claim 8, wherein the status information associates an individual data frame transmission state with supplemental information including at least one of a data flow identifier, a flow update time and a time stamp.

10. The apparatus of claim 9, wherein the supplemental information has been obtained by packet inspection in at least one of the user equipment, the radio access network and the core network.

11. The apparatus of claim 1, wherein the apparatus is comprised in a wireless communication network portion.

12. A method of providing status information relating to a wireless data transmission that is used to control an industrial process by a remote controller coupled to at least one field device of the industrial process via a wireless communication network supporting the wireless data transmission, the method comprising:
    receiving the status information via a first interface configured to be coupled to one of a user equipment, a radio access network and a core network of the wireless communication network; and
    providing, via a second interface compliant with an industrial process communication protocol used for communication between the remote controller and the at least one field device, at least one of the status information and status information derived therefrom, towards the remote controller.

13. The apparatus of claim 2, wherein the second interface is located on Layer 1 of the Open Systems Interconnection, OSI, model.

14. The apparatus of claim 2, wherein the second interface is a wire-based interface.

15. The apparatus of claim 2, wherein at least one of the industrial process communication protocol and the second interface are compliant with at least one of International Electrotechnical Commission, IEC, standard 61158 and IEC standard 61784.

* * * * *